United States Patent [19]
Ewald et al.

[11] 3,721,761
[45] March 20, 1973

[54] OPTICAL-TO-ELECTRICAL SIGNAL TRANSDUCER APPARATUS

[75] Inventors: William P. Ewald, Webster; Lenard M. Metzger, Rochester, both of N.Y.

[73] Assignee: Eastman Kodak Company, Rochester, N.Y.

[22] Filed: Dec. 23, 1971

[21] Appl. No.: 211,541

[52] U.S. Cl. ..........178/7.88, 178/7.85, 178/DIG. 28, 352/79, 352/80
[51] Int. Cl. .....G03b 21/12, G03b 21/28, H04n 9/08
[58] Field of Search............178/DIG. 28, 7.85, 7.88; 352/79, 80

[56] References Cited

UNITED STATES PATENTS

| | | | |
|---|---|---|---|
| 3,627,922 | 12/1971 | Goldmark | 178/DIG. 28 |
| 3,647,955 | 3/1972 | Reader | 178/DIG. 28 |
| 3,662,106 | 5/1972 | Buller | 178/7.88 |

*Primary Examiner*—Howard W. Britton
*Attorney*—W. H. J. Kline et al.

[57] ABSTRACT

Method and apparatus for alternately scanning first and second image frames on information bearing media located in first and second scanning positions, respectively, and providing electrical signals representative of the information in the image frames. A scanning spot of light traversed in two dimensions in a repetitive raster pattern is produced by a flying spot scanner tube and is directed in a first path including the first scanning position of the first image frame or a second path including the second scanning position of the second image frame. A reflective device is operable between a first position for reflecting the scanning spot of light to a first lens which directs the scanning spot of light through the first scanning position in the first path and to optical-to-electrical signal transducer apparatus and a second position for directing the scanning spot of light through a second lens, the second scanning position, a third lens and to the first lens of the first path. Optical-to-electrical signal transducer apparatus responds to the intensity of the light transmitted by a first image frame located in the first scanning position when the reflective device is located in the first position or transmitted by a second image frame located in the second scanning position when the reflective device is located in the second position to produce electrical signals representative of the information content of the first or second image frame. The first image frame may be carried by a moving information bearing media such as moving motion picture filmstrips, and the second image frame may comprise a stationary photographic transparency. The first lens is operable to alter the size of the scanning raster pattern produced by the flying spot scanner to correspond to the size of the first image frame; likewise the second lens is operable to change the size of the scanning raster pattern to correspond to the size of the second image frame. The third lens is operable to focus the scanning raster pattern directed through the second image frame upon the first lens. Normally, only one or the other of the first and second image frames is located in the first and second scanning position, respectively, and a switch may be activated by the manual movement of the reflective device from its first position to its second position to remove or prevent the location of the first image frames in the first scanning position.

13 Claims, 2 Drawing Figures

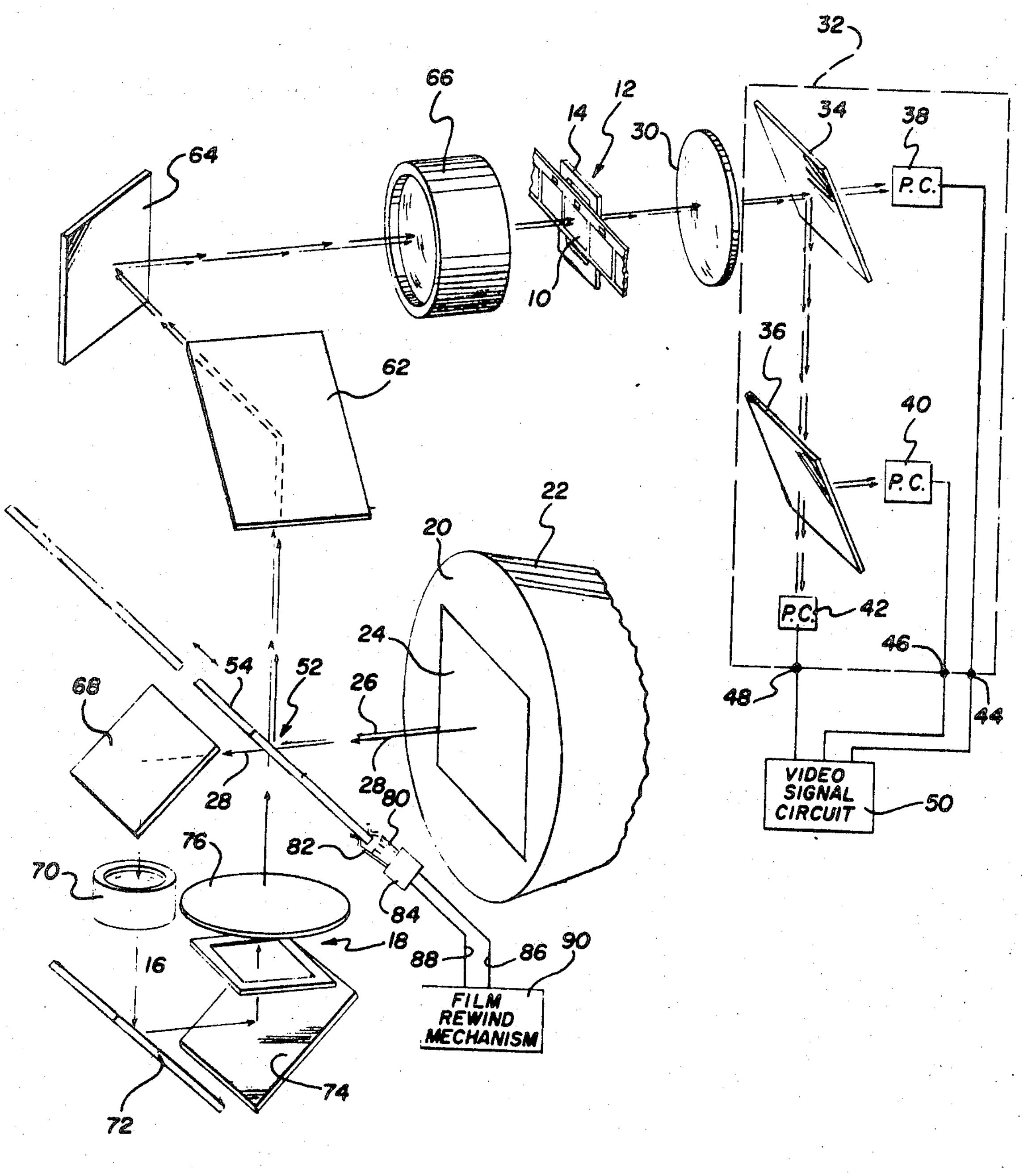
P.C.
P.C.
P.C.
VIDEO SIGNAL CIRCUIT
FILM REWIND MECHANISM

OPTICAL-TO-ELECTRICAL SIGNAL TRANSDUCER APPARATUS

CROSS REFERENCE TO RELATED APPLICATION

Reference is made to commonly assigned copending U.S. Pat. application Ser. No. 60,493, entitled FILM SCANNING FOR TELEVISION REPRODUCTION, filed Aug. 3, 1970, in the names of Lenard M. Metzger and David L. Babcock

BACKGROUND OF THE INVENTION

1. Field of the Invention

This invention relates to the production of electrical signals representative of the information content of image frames on information bearing media.

2. Description of the Prior Art

In the aforementioned commonly assigned copending U.S. Pat. application Ser. No. 60,493, there is described apparatus for scanning the image frames of continuously moving motion picture film for television reproduction. The scanning apparatus disclosed therein includes a flying spot scanner tube for developing a scanning spot of light and traversing the scanning spot of light in horizontal and vertical dimensions to produce a scanning raster pattern of 525 spaced horizontal lines repeating at 60 frames per second in accordance with U.S. NTSC standards, a film transport mechanism for continuously motion picture film frames through a scanning aperture or scanning position, apparatus for modifying the vertical deflection of the flying spot scanner tube to alter the vertical positioning of the scanning raster pattern in accordance with the rate of movement of the motion picture film, optical-to-electrical signal transducer apparatus responsive to the intensity of the light directed through, or transmitted by, the image frames of the motion picture film for producing electrical signals representative of the information content of the image frames, and further apparatus for encoding the electrical signals representative of the information content of the image frames with further synchronization and frequency modulation signals for producing a transmittable television signal that may be reproduced by a standard television receiver tuned to receive the transmittable signals. The television reproduction apparatus disclosed therein is intended for use in the home in cooperation with the color television receiver, so that the homeowner may display amateur or professional, black and white or color, motion picture film on his television receiver at any time.

Apparatus has been disclosed in the past for reproducing the images of stationary photographic transparencies or slides on a home television receiver. A desirable adjunct of the motion picture film scanning apparatus described in the aforementioned Ser. No. 60,493 is the feature of alternately, at the option of the viewer, displaying either motion picture filmstrips or slides on the same home television receiver through the use of the same film scanning apparatus. A problem that arises in the design and production of such an apparatus resides in the fact that the image frames of path including 8mm and 16mm motion picture filmstrips are much smaller than the image frames of the currently popular 126 and 135 transparency film sizes. Consequently, the lens system and scanning aperture of the motion picture filmstrip scanning system are not suitable to the display of photographic transparencies.

SUMMARY OF THE INVENTION

Accordingly, it is an object of the present invention to provide a method and apparatus for displaying both motion picture film image frames and photographic transparencies on a home color television receiver.

Furthermore, it is an object of the present invention to scan first and second image frames, selectively, with single scanning means and to reproduce the first or the second image frames in a television system.

Another object of the invention is to provide novel light directing apparatus for selectively directing light through first and second image frames to optical-to-electrical signal transducer apparatus.

In accordance with these and other objects, a method and apparatus is disclosed herein for selectively scanning first and second image frames on information bearing media located in first and second scanning positions, respectively, and providing electrical signals representative of the information in the scanned image frame. Such apparatus includes a source of radiation such as a scanning spot of light and means for traversing the scanning spot of light in two dimensions in a repetitive raster pattern, light directing apparatus operable in a first mode for directing the scanning spot of light in a first path including the first scanning position of the first image frame and operable in a second mode for directing the scanning spot of light in a second path including the second scanning position of the second image frame and the first scanning position of the first image frame, and optical-to-electrical signal transducer apparatus responsive to the scanning spot of light directed through the first scanning position for producing electrical signals representative of the intensity of the scanning spot of light modified by the information content of the first image frame, when the first image frame is located in the first scanning position, and by the information content of the second image frame, when the second image frame is located in the second scanning position. More particularly, the light directing apparatus further includes a first lens located in the first path for directing the scanning spot of light through the first scanning position, a second lens located in the second path or directing the scanning spot of light through the second scanning position, a third lens located in the second path with respect to the second scanning position for redirecting the scanning spot of light directed by the second lens through the second scanning position into the first path and to the first lens, a reflective device located with respect to the source of the scanning spot of light and operable in a first position corresponding to the first mode for directing the scanning spot of light in the first path and operable in a second position corresponding to the second mode for directing the scanning spot of light in the second path, and means for preventing the location of or for removing the first image frame from the first scanning position when the reflective device is operated in the second mode.

In the illustrative embodiment of the invention, the source of the scanning spot of light comprises a flying spot scanner tube, the first image frame may be an image frame of a continuously moving motion picture filmstrip and the second image frame may be a photographic transparency.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Figure 1:
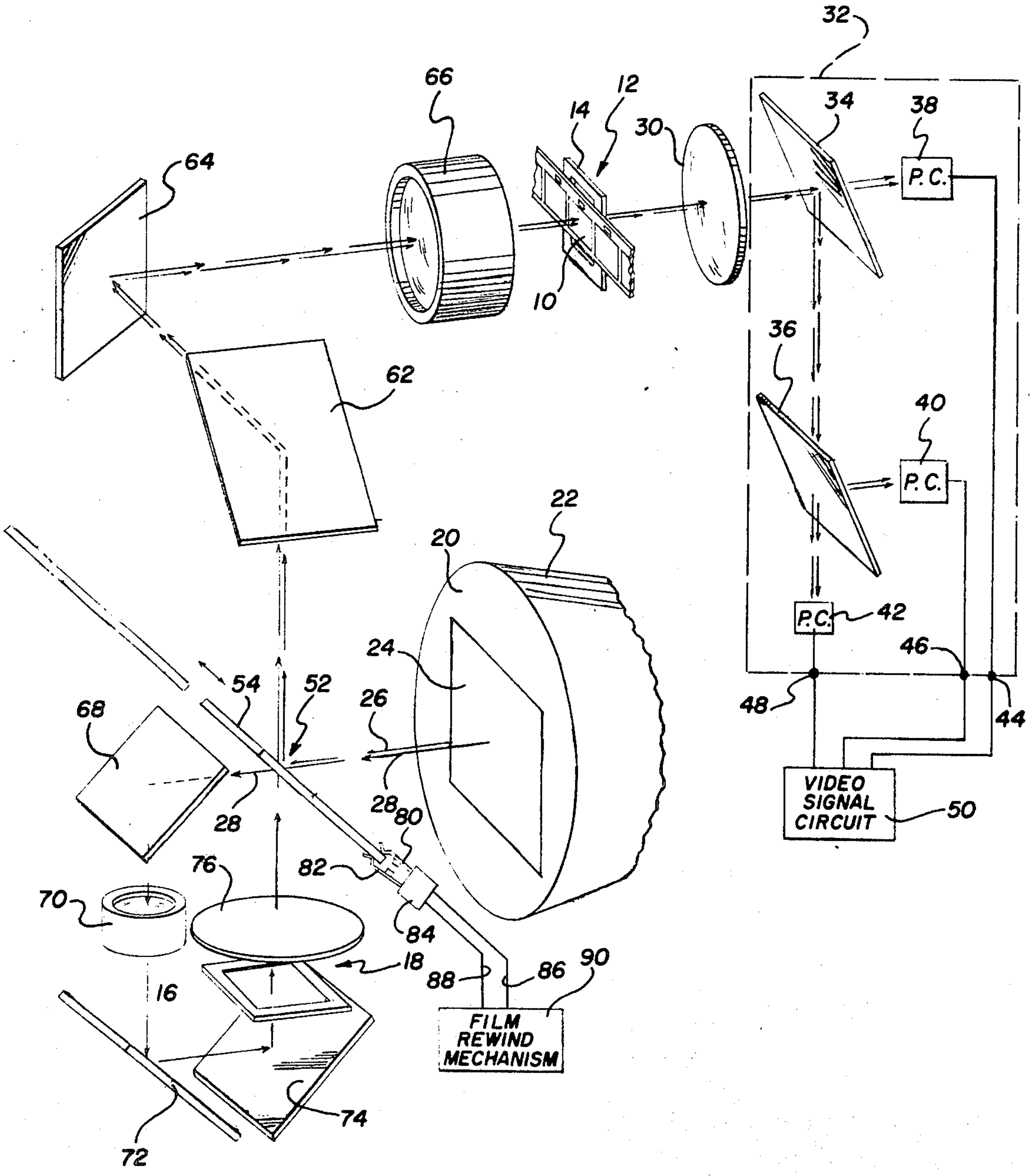
FIG. 1 is a schematic illustration in partial perspective of a first embodiment of the invention for scanning, alternately, first and second image frames located in first and second scanning positions.

Referring now to the drawings, and first to FIG. 1, as a first preferred embodiment of the invention, there is shown scanning apparatus for scanning a first image frame 10 located in a first scanning position 12 defined by the scanning gate 14 and a second image frame 16 located in a second scanning position 18. The scanning of the first and second image frames 10 and 16, respectively, is accomplished by radiation comprising a scanning spot of light developed on the face plate 20 of the partially shown flying spot scanner tube 22 in a manner well known in the prior art of television scanning. The scanning spot of light developed by the flying spot scanner tube 22 is traversed over the face plate 20 in a raster pattern consisting of spaced horizontal line scans of the scanning spot of light in the area enclosed by the rectangle 24 on the face plate 20. It will be understood that the flying spot scanner tube 22 may be controlled in the same manner as shown in the aforementioned Serial No. 60,493 for scanning either stationary or moving image frames. The scanning spot of light is directed from the area 24 of the flying spot scanner tube 22 in the direction of the arrows 26 and 28 although it will be understood that only a single scanning spot of light is represented by both of the arrows 26 and 28 at any instant in time.

The scanning spot of light directed through the first scanning position 12 is focused by a lens 30 upon optical-to-electrical signal transducer apparatus 32 which responds to the intensity of the scanning spot of light directed through the first scanning position 12 to develop electrical signals representative of the information in the first or second image frames 10 or 16 located in the first or second position 12 or 18, respectively. The optical-to-electrical signal transducer apparatus 32 may take many forms well known in the prior art, the form shown comprising first and second dichroic filters 34 and 36 which are operable to separate the color content of the scanning spot of light into three primary colors, red, green and blue, and to direct the three primary colors of light upon the photocells 38, 40 and 42. The photocells 38, 40 and 42 respond to the red, green and blue light, respectively, to produce electrical signals at the output terminals 44, 46 and 48, respectively, of the optical-to-electrical signal transducer apparatus 32. The output terminals 44, 46 and 48 are connected to a video signal developing circuit 50 depicted in block form. The video signal development circuit 50 may take many forms well known in the prior art and is effective to combine the electrical signals with synchronization signals and to modulate the signals to produce a transmittable video signal for television reproduction.

The novel light directing apparatus for alternately scanning a first or a second image frame in first and second scanning positions is interposed between the flying spot scanner tube 22 and the optical-to-electrical signal transducer apparatus 32 shown in FIG. 1. The scanning spot of light emitted by the flying spot scanner tube 22 is directed in the direction of the arrows 26 and 28 to the point 52 where the reflective device 54, which may consist of a mirror having a mirror surface 56, is normally positioned as shown in solid lines. When the reflective device 54 is in the first position, the scanning spot of light is reflected by the mirror surface 56 in a first path towards the mirror 62. The scanning spot of light is reflected by the mirror 62 upon the mirror 64 and the scanning spot of light is reflected by the mirror 64 upon the first lens 66 which may be called a raster projection lens. The first lens 66 is effective to focus the raster pattern of the scanning spot of light directed through the first path by the mirror surface 56 of the reflective device 54 upon the first image frame 10 located in the first scanning position 12. The scanning spot of light in the scanning raster pattern is transmitted by the first image frame 10, is modulated in intensity in each of the three primary colors by the information content of the image frame 10, and is directed by the lens 30 upon the optical-to-electrical transducer apparatus 32. Thus, when the reflective device 54 is in the first position, the scanning spot of light is directed through the first path including the mirrors 62 and 64 and the first lens 66, through the image frame 10, and to the optical-to-electrical signal transducer apparatus 32. Therefore, when the apparatus is operative in the first mode, that is when the mirror 54 is in the first position described above, the first image frames 10 are scanned and converted into video signals for television reproduction.

When the reflective device 54 is in the second position shown in FIG. 1 by the broken lines, the scanning spot of light continues past the point 52 in he direction of the arrow 28 in a second path wherein the second image frame 16 is located in the second scanning station 18. More particularly, the scanning spot of light is directed in the direction of the arrow 28 upon the mirror surface of the mirror 68 which reflects the scanning spot of light upon the second lens 70, which may be referred to as a raster relay lens. The second lens 70 directs the scanning spot of light upon the mirror surfaces of mirrors 72 and 74 which redirect the scanning spot of light through the second image frame 16 located in the second scanning position 18. The scanning spot of light transmitted by the second image frame 16 is directed by a third lens 76 (which may be referred to as a field lens) upon the mirror surface of the mirror 62 in he first path. Thus, when the light directing apparatus of FIG. 1 is operative in the second mode, that is when the mirror 54 is located in the broken line position shown in FIG. 1, the scanning light beam is directed through a second path including the mirror 68, the second lens 70, the mirrors 72 and 74, the second image frame 16 in the second scanning position 18, and the lens 76 back to the first path as shown by the arrow 28.

The second lens 70 of the second optical path is effective to change the size of the scanning raster pattern developed in he area 24 of the face plate 20 of the flying spot scanning tube 22 so that it may be directed by the mirrors 72 and 74 through the area of the second image frame 16. The third lens 76 is effective to project the scanning spot of light in the scanning raster pattern transmitted by the second image frame 16 upon the first lens 66 in the first path, so that the first lens 66 may change the size of the scanning raster pattern so that it passes through the first scanning station 12 and to the optical-to-electrical signal transducer apparatus 32.

As shown in FIG. 1, for example, the scanning raster pattern developed in the area 24 of the face plate 20 of the flying spot scanner tube 22 is larger than either the first or the second image frame. The size of the scanning raster pattern is reduced by the first lens 66, so that it may be focused upon the first image frame 10. The size of the scanning raster pattern is also reduced by the second lens 70, so that it may be directed through the second image frame 16. The third lens 76 is effective to expand the image of the scanning raster pattern transmitted by the second image frame back to the same size as the scanning raster pattern originally appears in the area 24 of the face plate 20 of the flying spot scanner tube 22. The second scanning position 18 and the third lens 76 are situated at the same effective path length distance from the first lens 66 as is the face plate 20 of the flying spot scanner tube 22.

As described hereinbefore, the light directing apparatus may be employed alternately to scan the first image frame 10, which may be contained on an information bearing media such as a moving motion picture filmstrip, in the first path, or it may be employed to scan a second image frame 16 located in the second scanning position 18 through the use of the same flying spot scanner tube 22 and the same optical-to-electrical signal transducer apparatus 32. The light directing apparatus is operable in the first mode to direct the scanning spot of light in the first path through the first image frame 10 and is operable in the second mode to direct the scanning spot of light in the direction of the arrow 28 through the second path including the second image frame 16 and thereafter through the first path including the first scanning position 12. The reflective device 54 is electrically insulating and is adapted to engage spring contacts 80 and 82 of switch 84 and open an electrical circuit between the spring contacts 80 and 82 when the reflective device 54 is located in the first position shown in solid lines in FIG. 1. The switch contacts 80 and 82 are electrically connected by conductors 86 and 88 to a film rewind mechanism 90 which is provided with the transport mechanism (not shown) of the motion picture filmstrip carrying the first image frame 10. When the film rewind mechanism 90 is operative, the motion picture filmstrip in the first scanning station 12 is rewound and cannot be readvanced through the first scanning station 12 until the film rewind mechanism 90 is reset.

The electrical circuit defined by the spring contacts 80 and 82 and the conductors 86 and 88 is closed in response to the movement of the reflective device 54 into the second scanning position, and the film rewind mechanism 90 is operative, as described above, to rewind any filmstrip, or otherwise remove any first image frames 10, in the first scanning position and/or to prevent the advance of the first image frames 10 into the first scanning position 12. This operation insures that when the second image frame 16 is scanned by the scanning light, the first image frame 10 is not present at the first scanning position 12.

When the reflective device is either manually or automatically moved back into the first position corresponding to the first mode shown in solid lines in FIG. 1, the above described circuit is broken by the reflective device 54 and the film rewind mechanism 90 is rendered nonoperative to prevent the advancement of filmstrips into the first scanning position 12.

In a similar manner other schemes could be devised to insure that only one or the other of the first or second image frames 10 or 16, respectively, is scanned at the same time that the reflective device is properly positioned to scan the requsite image frame. Of course, it would also be obvious to provide apparatus to override such controls so that the first and second image frames 10 and 16 could be simultaneously scanned so that the two images might be merged in a single video signal.

Figure 2:
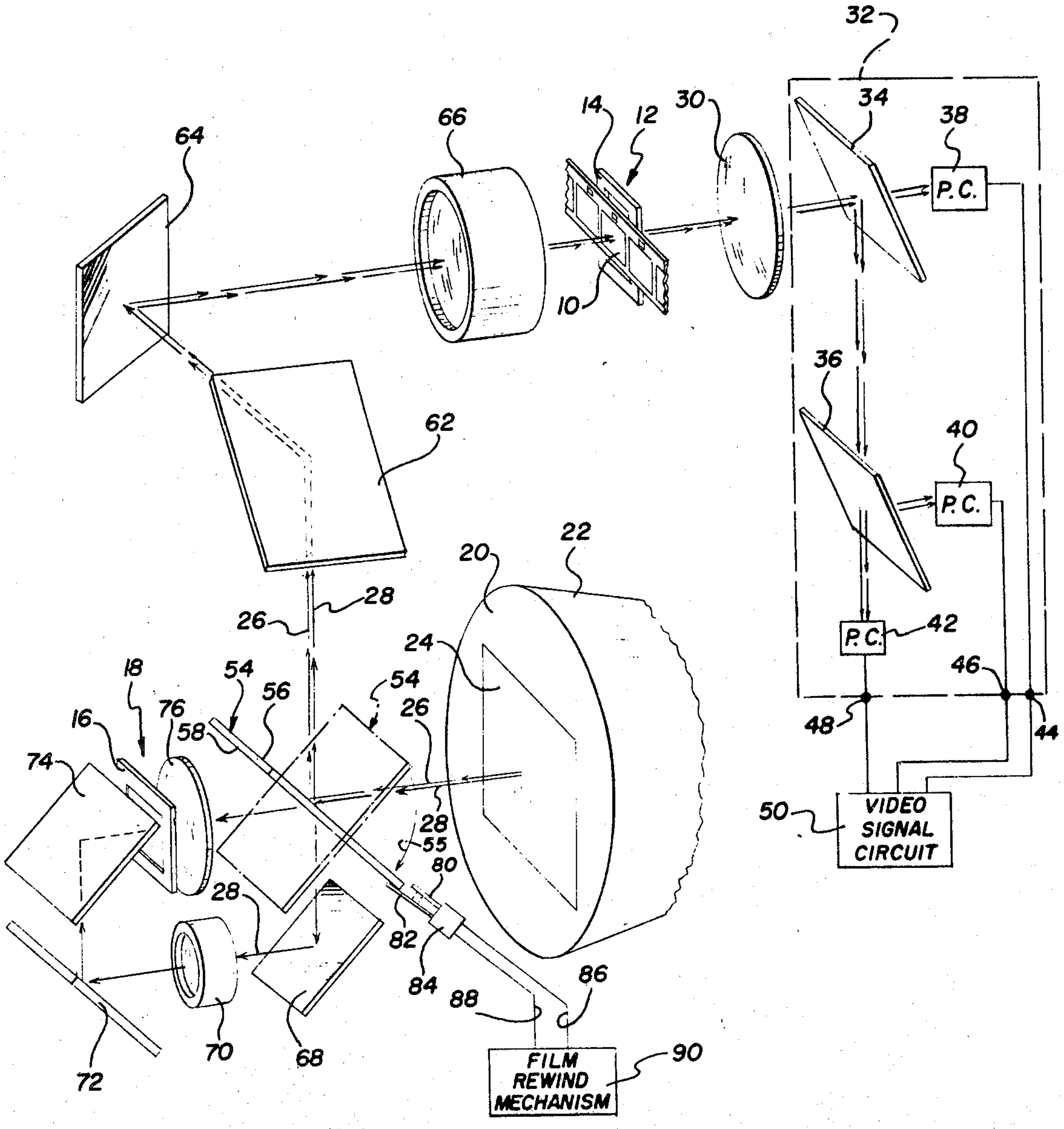
FIG. 2 is a schematic illustration in partial perspective of a second embodiment of the present invention for scanning, alternately, first and second image frames located in first and second scanning positions.

Referring now to FIG. 2, there is shown a second embodiment of the present invention for alternately scanning a first image frame 10 located in the first scanning position 12 in the first optical path and the second image frame 16 located in the second scanning station 18 in the second optical path and for reproducing the scanned image frames in a video system. The elements of the scanning apparatus of FIG. 2 are designated by the same numerals as the corresponding elements are designated in FIG. 1 and further description of all these elements is deemed to be unnecessary. The first path of light directing apparatus of FIG. 2 includes the mirror surfaces of the mirrors 62 and 64, the first lens 66, the first scanning station 12, and the lens 30. In the same manner, the second path of the light directing apparatus includes the mirror surface of the mirror 68, the second lens 70, the mirror surfaces of the mirrors 72 and 74, the second scanning station 18, the third lens 76, and the above described elements of the first path. The apparatus of FIG. 2 differs from the apparatus of FIG. 1 in that the reflective device 54 of FIG. 2 has mirror surfaces 56 and 58 on either side of the reflective device 54, and the reflective device 54 pivots about its axis from a second position, shown in broken lines, and corresponding to the second mode of operation of the light directing apparatus, in the direction of the arrow 55 to the first position, shown in solid lines, and corresponding to the first mode of operation of the light directing apparatus.

As shown in FIG. 2, when the reflective device 54 is in the second position, the scanning spot of light is directed in the direction of the arrow 28 by he mirror surface 56 of the reflective device 54 upon the mirror surface of the mirror 68 and through the second lens 70 to the reflective surfaces of the mirrors 72 and 74 and through the second scanning position 18 back to the mirror surface 58 of the reflective device 54. Thus the scanning spot of light is directed in the direction of the arrow 28 through the second path of the light directing apparatus through the second scanning position and is directed by the mirror surface 58 of the reflective device 54 into the first path of the light directing apparatus, whereby the second image frame 16 is scanned, and the scanned second image frame is directed by the first lens 66 through the first scanning position 12 to the optical-to-electrical signal transducer apparatus 32.

When the reflective device 54 is moved in the direction of the arrow 55 to its first position, the scanning spot of light is reflected by the mirror surface 58 in the direction of the arrow 26 in the first path of the light directing apparatus, whereby a first image frame 10 located in the first scanning station 12 may be scanned by the flying spot scanning tube 22.

In the same manner as described with respect to FIG. 1, the first lens 66, the second lens 70 and the third lens 76 cooperate to insure that the size of the scanning raster pattern produced in the area 24 of the face plate 20 of the flying spot scanning tube 22 is compensated for in either mode of operation of the light directing apparatus. Also, the first image frame 10 may be contained on motion picture film moving through the first scanning position 12, and the second image frame 16 may be a photographic transparency positioned in the second scanning position. In the same manner as described with respect to FIG. 1, switch contacts 80 and 82 are opened by the movement of the reflective device 54 from the first position to the second position, and the film rewind mechanism 90 is rendered operative to remove from, and prevent the advance into, the first scanning position 12, the first image frame 10, or other means may be provided to prevent the simultaneous scanning of a first image 10 and the first scanning position 12 and the second image frame 16 in the second scanning position 18.

It is contemplated that the first or second scanning positions 12 or 18 may be modified to accept any type, size or format of image bearing media or photographic originals, such as color and black and white photographic originals, microfilm photographic originals, microfiche cards, photographic transparencies, and the like. It is also contemplated that the first scanning station 12 may comprise the scanning aperture for continuously moving motion picture film shown in the aforementioned U.S. application Ser. No. 60,493, and the second scanning station 18 may be the projection station of an automatic photographic projector for photographic transparencies. Thus the light directing apparatus of the present invention may be incorporated in a color television console system including automatic slide and film projecting apparatus of the type hereinbefore described.

Furthermore, the light directing apparatus of the present invention may be employed with a light source substituted for the flying spot scanner tube 22 and a video television camera scanning tube, such as an image orthocon tube, for example, substituted for the optical-to-electrical signal transducer apparatus 32. Alternately, any other source of a scanning spot of light may be substituted for the flying spot scanner tube 22.

As may be seen, a novel system has been disclosed for directing a scanning spot of light in first and second paths and for scanning first and second image frames located in the first and second paths for reproduction of the first and second image frames on a television receiver.

We claim:

1. Apparatus for selectively exposing first and second image frames on information bearing media located in first and second positions, respectively, to radiation, and providing electrical signals representative of the information in said image frames, said apparatus comprising:

a. a source of radiation;

b. light directing means operable in a first mode for directing radiation in a first path including the first position of the first image frame and operable in a second mode for directing the radiation in a second path including the second position of the second image frame and the first position of the first image frame; and c. optical-to-electrical signal transducer means responsive to the radiation directed through the first position for producing electrical signals representative of the intensity of the radiation modified by the information content of the first image frame, when the first image frame is located in the first position and the light directing means is operated in said first mode, and the second image frame, when the second image frame is located in the second position and the light directing means is operated in said second mode.

2. The apparatus of claim 1 wherein said light directing means further comprises:

a. a first lens located in the first path for projecting the radiation through the first position;

b. a second lens located in the second path for projecting the radiation through the second position;

c. a third lens for directing the radiation projected through the second position by said second lens in the second path to said first lens located in the first path; and d. reflective means operable in first and second reflective positions corresponding to said first and second modes, respectively, said reflective means being operable in said first reflective position for directing the radiation from said source or radiation to said first lens in the first path and operable in said second reflective position for directing the radiation to said second lens and said third lens in the second path, and said first lens in the first path.

3. The apparatus of claim 1 further comprising means responsive to the operation of said light directing means in said second mode for removing the first image frame from the first position and preventing the location of the first image frame in the first position.

4. A method of selectively exposing first and second image frames on information bearing media located in first and second positions, respectively, to radiation, and providing electrical signals representative of the information in said image frames, said method comprising the steps of:

a. directing radiation in a first path including the first position of the first image frame;

b. detecting the radiation directed in the first path and through the first image frame in the first position and producing electrical signals representative of the intensity of the radiation modified by the information content of the first image frame;

c. directing radiation in a second path including the second position of the second image frame and the first position of the first image frame; and d. detecting the radiation directed in the second path and through the second image frame in the second position and producing electrical signals representative of the intensity of the radiation modified by the information content of the second image frame.

5. Apparatus for selectively scanning first and second image frames on information bearing media located in first and second scanning positions, respectively, and providing electrical signals representative of the information in said image frame, said apparatus comprising:

a. means for producing a scanning spot of light and for traversing the scanning spot of light in two dimensions in a repetitive scanning raster pattern;
b. light directing means operable in a first mode for directing the scanning spot of light in a first path including the first scanning position of the first image frame and operable in a second mode for directing the scanning spot of light in a second path including the second scanning position of the second image frame and the first scanning position of the first image frame; and
c. optical-to-electrical signal transducer means responsive to the scanning spot of light directed through the first scanning position for producing electrical signals representative of the intensity of the scanning spot of light modified by the information content of the first image frame, when the first image frame is located in the first scanning position and the light directing means is operated in said first mode, and the second image frame, when the second image frame is located in a second scanning position and the light directing means is operated in said second mode.

6. The apparatus of claim 5 wherein the scanning spot of light means comprises a flying spot scanner tube for producing a television scanning raster pattern of light on the face plate of the flying spot scanner tube.

7. The apparatus of claim 5 wherein the first image frame comprises an image frame of a continuously moving film of image frames introduced into said first scanning position; said second image frame comprises a stationary film transparency; and wherein said second image frame is larger in size than said first image frame.

8. The apparatus of claim 5 wherein said light directing means further comprises:

a. a first lens located in the first path for projecting the scanning raster pattern developed by the scanning spot of light through the first scanning position;
b. a second lens located in the second path for projecting the scanning raster pattern developed by the scanning spot of light means through the second scanning position;
c. a third lens for directing the scanning raster pattern projected through the second scanning position by said second lens to said first lens located in the first path; and
d. reflective means operable in first and second positions corresponding to said first and second modes, respectively, said reflective means being operable in said first position for directing the scanning raster pattern in the first path to said first lens and operable in said second position for directing said scanning raster pattern in the second path to said second lens and said third lens and in the first path to said first lens.

9. The apparatus of claim 8 wherein the reflective means comprises a mirror having first and second mirror surfaces and means for rotating the mirror from said first position wherein said first mirror surface reflects the scanning raster pattern into the first path, to said second position wherein said second mirror surface reflects the scanning raster pattern into said second path and said first mirror surface reflects the scanning raster pattern directed through said third lens into the first path.

10. The apparatus of claim 9 further comprising means responsive to the operation of said mirror in said second position for removing the first image frame from the first scanning position and preventing the location of the first image frame in the first scanning position.

11. In apparatus for selectively displaying first image frames or motion picture film or a second image frame on a photographic transparency on a television screen, apparatus for selectively scanning the first and second image frames located in first and second scanning positions, respectively, and providing electrical signals representative of the information in said image frames for control of the reproduction of the images on the television comprising:

a. means for producing a scanning spot of light and for traversing the scanning spot of light in two dimensions in a repetitive scanning raster pattern;
b. light directing means operable in a first mode for directing the scanning spot of light in a first path including the first scanning position of the first image frame on the motion picture film and operable in a second mode for directing the scanning spot of light in a second path including the second scanning position of the second image frame on the photographic transparency and the first scanning position of the first image frames; and
c. optical-to-electrical signal transducer means responsive to the radiation directed through the first scanning position for producing electrical signals representative of the intensity of the scanning spot of light modified by the information content of the first image frames, when the first image frames on the motion picture film are located in the first scanning position and the light directing means is operated in said first mode, and the second image frame on the photographic transparency, when the second image frame is located in the second scanning position and the light directing means is operated in said second mode, whereby the electrical signals may be used to control the reproduction of the first or second image frames on the television receiver.

12. The apparatus of claim 11 further comprising means for moving the first image frames on the motion picture film through the first scanning position in response to the operation of the light directing means in the first mode and for removing the first image frames on the motion picture film from the first scanning position in response to the operation of the light directing means in the second mode.

13. Apparatus for selectively scanning first and second image frames located in first and second scanning positions, respectively, and providing electrical signals representative of the information in said image frames, said apparatus comprising:

a. means for producing a scanning spot of light and for traversing the scanning spot of light in two dimensions in a repetitive scanning raster pattern;

b. light directing means operable in a first mode for directing the scanning spot of light in a first path including the first scanning position of the first image frame, and operable in a second mode for directing the scanning spot of light in a second path including the second scanning position of the second image frame and the first scanning position of the first image frame, said light directing means further comprising:

1. first lens means located in the first path for projecting the scanning raster pattern produced by the scanning spot of light means through the first scanning position;
2. second lens means located in the second path for projecting the scanning raster pattern produced by the scanning spot of light means through the second scanning position;
3. third lens means located in the second path with respect to the second scanning position for directing the scanning raster pattern produced by the scanning spot of light means, and directed by the second lens means through the second scanning position, into the first path and to said first lens means; and
4. reflective means located with respect to said scanning spot of light means and operable in a first position corresponding to said first mode for directing the scanning raster pattern into the first path and operable in a second position corresponding to said second mode for directing the scanning raster pattern in the second path;

c. means responsive to the operation of the reflective means in the second position for preventing the location of the first image frame in the first scanning position; and d. optical-to-electrical signal transducer means responsive to the scanning spot of light projected through the first scanning position for producing electrical signals representative of the intensity of the scanning spot of light modified by the information content of the first image frame, when the first image frame is located in the first scanning position and the light directing means is operated in said first mode and modified by the information content of the second image frame, when the second image frame is located in the second scanning position and the light directing means is operated in said second mode.

* * * * *